United States Patent [19]
Weidmann

[11] Patent Number: 5,906,784
[45] Date of Patent: May 25, 1999

[54] CURABLE EPOXY RESIN COMPOSITIONS

[75] Inventor: Ulrich Weidmann, Basel, Switzerland

[73] Assignee: Ciba Specialty Chemicals Corporation, Tarrytown, N.Y.

[21] Appl. No.: 08/959,502

[22] Filed: Oct. 28, 1997

[30] Foreign Application Priority Data

Oct. 30, 1996 [CH] Switzerland .............................. 2679/96

[51] Int. Cl.⁶ .................................................. B29C 43/02
[52] U.S. Cl. ................................ 264/328.13; 264/331.12; 523/465
[58] Field of Search ....................... 523/465; 264/328.13, 264/331.12

[56] References Cited

U.S. PATENT DOCUMENTS

| 4,042,550 | 8/1977 | Tuller et al. | 260/280 |
| 5,258,151 | 11/1993 | Bayer et al. | 264/63 |

FOREIGN PATENT DOCUMENTS

| 0333456 | 9/1989 | European Pat. Off. . |
| 0497987 | 8/1992 | European Pat. Off. . |
| 0738759 | 10/1996 | European Pat. Off. . |
| 1323343 | 7/1973 | United Kingdom . |

OTHER PUBLICATIONS

Patent Abstracts of Japan, Publication No. 58152047.
Lee & Neville, Handbook of Epoxy Resins, McGraw–Hill pp. 4–60 & 4–66, 1967.

*Primary Examiner*—Robert Dawson
*Assistant Examiner*—D. Aylward
*Attorney, Agent, or Firm*—David R. Crichton; Michele A. Kovaleski

[57] ABSTRACT

Epoxy resin compositions, comprising
(a) an epoxy resin which is liquid at below 160° C. and which has an average of more than one epoxy group in the molecule,
(b) a di- or polycarboxylic acid or its anhydride,
(c) 0.1–15 % by weight, based on the amount of components (a) and (b), of a wax having a dropping point from 80 to 95° C. and, optionally,
(d) customary fillers or modifiers for epoxy resins, are preferably used as epoxy casting resin compositions, in particular for the preparation of moulded articles by the pressure gelation process.

16 Claims, No Drawings

CURABLE EPOXY RESIN COMPOSITIONS

The present invention relates to curable epoxy resin compositions comprising a wax having a dropping point of 80–95° C., to the use of the novel epoxy resin compositions as casting resins, especially for the preparation of moulded articles by the pressure gelation process.

To demould moulded articles, consisting of cured casting resin systems based on epoxy resins and polycarboxyic acid anhydrides as curing agents, from the mounds, external mould release agents are normally applied to the surface of the mould, for example Ciba-Geigy's commercially available "Trennmiftel QZ 13" based on silicones. Too highly concentrated mould release agents on these surfaces usually leave marks on the cured moulded articles.

Moulded articles based on epoxy resins can also be prepared by the so-called automatic pressure gelation process (=APG process) for which specific epoxy resin mixtures are used. In the APG process, which is described, inter alia, in GB-Patent 1 323 343 or in EP-Patent 0 333 456, liquid curable epoxy resin mixtures, preheated to about 40 to 60° C., are introduced under slight pressure into moulds heated to curing temperatures. The shrinkage of the gelled mass in the mould is compensated for by subsequent further addition of curable epoxy resin mixture under pressure. However, the epoxy resin mixtures used to date require the moulds to be frequently cleaned.

It has now been found that curable epoxy resin compositions comprising a specific wax as internal mould release agent can be advantageously processed to moulded articles without the surfaces of the moulds used needing to be cleaned frequently and without the mechanical properties of the moulded articles produced being impaired.

Accordingly, this invention relates to epoxy resin compositions, comprising (a) an epoxy resin which is liquid at below 160° C. and which has an average of more than one epoxy group in the molecule, (b) a polycarboxyiic acid or its anhydride, (c) 0.1–15% by weight, based on the amount of components (a) and (b), of a wax having a dropping point from 80 to 95° C. and, optionally, (d) customary fillers or modifiers for epoxy resins, preferably for casting resins.

Epoxy resins (a) suitable for the preparation of the novel curable epoxy resin compositions are the epoxy resins customarily used in the epoxy resin technology which are liquid at below 160° C. Typical examples of epoxy resins are:

I) Polyglycidyl and poly($\beta$-methylglycidyl) esters which are obtainable by reacting a compound containing at least two carboxyl groups in the molecule and epichlorohydrin or $\beta$-methylepichlorohydrin. The reaction is conveniently carried out in the presence of a base. Compounds containing at least two carboxyl groups in the molecule may suitably be aliphatic polycarboxylic acids. Examples of such polycarboxylic acids are oxalic acid, succinic acid, glutaric acid, adipic acid, pimelic acid, suberic acid, azelaic acid or dimerised or trimerised linoleic acid.

It is, however, also possible to use cycloaliphatic polycarboxylic acids such as tetrahydrophthalic acid, 4-methyltetrahydrophthalic acid, hexahydrophthalic acid or 4-methylhexahydrophthalic acid.

Aromatic polycarboxylic acids can also be used, typically phthalic acid, isophthalic acid or terephthalic acid.

II) Polyglycidyl or poly($\beta$-methylglycidyl) ethers which are obtainable by reacting a compound containing at least two free alcoholic hydroxyl groups and/or phenolic hydroxyl groups and epichlorohydrin or $\beta$-methylepichlorohydrin, under alkaline conditions or in the presence of an acid catalyst and by subsequent treatment with alkali.

The glycidyl ethers of this type are typically derived from acyclic alcohols, typically from ethylene glycol, diethylene glycol and higher poly(oxyethylene) glycols, propane-1,2-diol or poly(oxypropylene) glycols, propane-1,3diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, as well as from polyspichlorohydrins.

They may also be derived from cycloaliphatic alcohols such as 1,4-cyclohexanedimethanol, bis(4hydroxycyclohexyl)methane or 2,2-bis(4-hydroxycyclohexyl)propane, or they contain aromatic nuclei such as N,N-bis(2-hydroxyethyl)aniline or p,p'-bis(2-hydroxyethylamino)-diphenylmethane.

The glycidyl ethers may also be derived from mononuclear phenols, typically from resorcinol or hydroquinone, or they are based on polynuclear phenols such as bis(4-hydroxyphanyt)-methane, 4,4'-dihydrxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo4-hydroxyphenyl)) propane as well as on novolaks obtainable by condensation from aldehydes such as formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols of the type cited above.

(III) Poly(N-glycidyl) compounds obtainable by dehydrochlorination of the reaction products of epichlorohydrin with amines which contain at least two amine hydrogen atoms. These amines are typically aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkylene ureas such as ethylene urea or 1,3-propylene urea, and diglycidyl derivatives of hydantoins, typically 5,5-dimethylhydantoin.

IV) Poly(S-glycidyl) compounds, typically di-S-glycidyl derivatives which are derived from dithiols such as ethane-1,2-dithiol or bis(4-mercaptomethylphenyl) ether.

V) Cycloaliphatic epoxy resins, typically bis(2,3-epoxycyclopentyl) ether, 2,3-epoxycyclopentyl glycidyl ether, 1,2-bis(2,3-epoxycyclopentyloxy)ethane or 3,4-poxycyclohexylmethyl-3',4'-epoxycyclohexancarboxylate.

It is also possible to use epoxy resins in which the 1,2-epoxy groups are attached to different hetero atoms or functional groups. These compounds typically comprise the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

For the preparation of the novel curable epoxy resin compositions it is preferred to use a liquid polyglycidyl ether or ester, preferably a liquid bisphenol diglycidyl ether or a liquid diglycidyl ester of a cycloaliphatic or aromatic dicarboxylic acid. It is also possible to use mixtures of epoxy resins.

Component (b) in the novel epoxy resin compositions can be, for example, aliphatic polycarboxylic acids, typically maleic acid, oxalic acid, succinic acid, nonyl- or dodecylsuccinic acid, glutaric acid, adipic acid, pimelic acid, suberic acid, azelaic acid or dimerised or trimerised linoleic acid, cycloaliphatic polycarboxylic acids, typically tetrahydrophthalic acid, methylendomethylenetetrahydrophthalic acid, hexachloroendomethylenetetrahydrophthalic acid, 4-methyltetrahydrophthalic acid, hexahydrophthalic acid or 4-methylhexahydrophthalic acid, or aromatic polycarboxylic acids, typically phthalic acid, isophthalic acid, terephthalic acid, trimellitic acid, pyromellitic acid or benzophenon-3,3',4,4'-tetracarboxylic acid as well as the anhydrides of the cited polycarboxylic acids. The cited polycarboxylic acids are known compounds.

Component (b) in the novel epoxy resin compositions is preferably a cycloaliphatic dicarboxylic acid anhydride.

Component (b) is usually used in such amounts that 0.4 to 1.1 equivalents of carboxyl group or anhydride group are present in the novel epoxy resin compositions per 1 equivalent of epoxy group.

The waxes used as component (c) in the novel epoxy resin compositions are also known compounds which are commercially available, for example as Hoechst waxes. The waxes to be used according to this invention have a dropping point according to DIN 51801 from 80–95° C., preferably from 80–90° C., an acid value according to DIN 53402 from 25–40, preferably from 25–35, and a saponification value according to DIN 53401 from 120–140, preferably from 125–135.

The wax used for the novel epoxy resin compositions is preferably an ester wax based on montan wax.

The novel curable epoxy resin compositions can also contain the fillers and modifiers customarily used in epoxy resin technology. Suitable fillers are for example: mineral and fibrous fillers, typically quartz powder, fused silica, aluminium oxide, glass powder, mica, kaolin, dolomite, graphite, carbon black, as well as carbon fibres and textile fibres. Preferred fillers are quartz powder, fused silica, aluminium oxide or dolomite. Suitable modifiers are pigments, dyes, flame retardants, thixotropic agents, flow control agents, antioxidants or light stabilisers. The proportion of fillers and modifiers in the novel epoxy casting resin compositions totals at most 85% by weight, based on the components (a), (b) and (c).

The novel curable epoxy resin compositions are prepared by methods known per se, typically using mixing units, e.g. stirrers.

The novel curable compositions are cured to moulded articles, coatings and the like by the customary methods of epoxy resin technology, such as described, inter alia, in "Handbook of Epoxy Resins", 1967, by H. Lee and K. Neville.

As mentioned at the outset, the novel epoxy resin compositions are preferably suitable as casting resin compositions.

Accordingly, this invention also relates to epoxy casting resin compositions, comprising
(a) an epoxy resin which is liquid at below 160° C. and which has an average of more than one epoxy group in the molecule,
(b) a polycarboxylic acid or its anhydride,
(c) 0. 1–15% by weight, based on the amount of components (a) and (b), of a wax having a dropping point from 80 to 95° C. and, optionally,
(d) customary fillers or modifiers for epoxy casting resin compositions.

The novel epoxy casting resin compositions are preferably prepared by melting the wax, with stirring, at above 100° C. and adding the epoxy resin, which may be filled, and the polycarboxylic acid or its anhydride, with stirring, at above 100° C. and, with further stirring, intimately mixing this mixture at this temperature such that the wax is dispersed in the epoxy casting resin compositions.

Components (a) and (b) in the novel epoxy casting resin compositions are preferably the same compounds as those used in the novel epoxy resin compositions.

The fillers used in the novel epoxy casting resin compositions are preferably powdered fillers, and the modifiers are also added in powdered or liquid form to the epoxy casting resin compositions.

The novel curable epoxy casting resin compositions are preferably, and in advantageous manner, processed as casting resins by the APG process, the preparation of moulded articles from the novel epoxy casting resins by the APG process thus being a preferred form of application.

In another of its aspects, this invention therefore also relates to the use of the novel epoxy casting resins for the preparation of moulded articles by the pressure gelation process, in particular for the preparation of large-surface moulded articles by the APG process.

If the novel curable epoxy casting resin compositions are used in the APG process, the epoxy casting resin compositions are preferably heated to above 100° C. and are then filled into a mould heated to above 100° C. under a slight casting pressure, preferably in the range from $0.1 \cdot 10^{-5}$ Pa–$5.0 \cdot 10^{-5}$ Pa.

EXAMPLE 1

The stirred pot of a double-motion agitator is charged with 10.02 g of an ester wax based on montan wax having a dropping point of 83° C., commercially available under the name "Hoechst Wachs KSL", of Hoechst AG, which is then melted, with stirring, at 140° C. When the wax has melted completely, 808.15 g of a filled epoxy resin, consisting of 24–28% by weight of a diglycidyl ether of bisphenol A having an epoxy value of 1.0–5.3 equivalents/kg, 0.03% by weight of the flow control agent BYK®W 935, of BYK-Malinckrodt, 2.0% by weight of a mixture consisting of titanium dioxide RHD 6, of Tioxide, England, and iron oxide yellow, of Harcros Pigmente, England, at a ratio of 9:1, 59.91% by weight of quartz Z 300, of Hoben Davis, England, and 9.99% of quartz 3M 500, of Sihelco, Switzerland, and 181.80 g of hexahydropthalic anhydride are added in succession. The resulting readily stirrable liquid is stirred for another 20 minutes at 140° C. Subsequently, this mixture is degassed at 140° C. and at about $3 \cdot 10^{-2}$ Pa for about 15 minutes. The mixture is then cast in aluminium or steel moulds and cured for 10 minutes at 160° C. and for 2 hours at 135° C. The cured moulded article can be removed from the aluminium or steel surfaces without any problems and has the following properties:

| | | |
|---|---:|---|
| tensile strength according to ISO R 527 | 84 | MPa |
| flexural strength according to ISO 178 | 136 | MPa |
| modulus of elasticity of flexural strength | 9071 | MPa |
| impact strength according to Charpy | 9.69 | kJ/m² |
| glass transition temperature *) | 125° C. | |

*) determined by the torsional analysis method

EXAMPLE 2

The stirred pot of a double-motion agitator is charged with 225 g of an ester wax based on montan wax having a dropping point of 83° C., commercially available under the name "Hoechst Wachs KSL", of Hoechst AG, and the wax is then melted, with stirring, at 140° C. When the wax has melted completely, 18.14 kg of a filled epoxy resin, consisting of 24–28% by weight of a diglycidyl ether of bisphenol A having an epoxy value of 1.0–5.3 equivalents/kg, 0.03% by weight of the flow control agent BYK®W 935, 2.0% by weight of a mixture consisting of titanium dioxide RHD 6 and iron oxide yellow at a ratio of 9:1, 59.91% by weight of quartz Z 300 and 9.99% by weight of quartz M 500 are added and the mixture is then stirred at 100° C. for another 30 minutes. Subsequently, 4.08 kg of hexahydrophthalic anhydride are added and the mixture is stirred for another 30 minutes at 85° C. The resulting readily stirrable liquid is then stirred for another 20 minutes at 140° C. The mixture is then degassed at 140° C. and at about $3 \cdot 10^{-2}$ Pa for 15 minutes. The mixture is filled into the autoclave of an automatic pressure gelation press (APG press), of Leisure & Vogel, and then processed by the pressure gelation process to kitchen sinks.

| | |
|---|---|
| autoclave temperature: | 80° C. |
| mould temperature: | 160° C. |
| casting pressure: | $0.5 \cdot 10^{-5}$ Pa |
| pressure adjustment | $1.5 \cdot 10^{-5}$ Pa after 1 minute, 45 seconds |
| demoulding time including filling time: | 10 minutes. |

An beige kitchen sink is obtained which can be demoulded independently and which has no visible colour inhomogeneities.

EXAMPLE 3

2.8 kg of digylcidyl ether of bisphenol A having an epoxy value of 5.0–5.25 equivalents/kg, 2.38 kg of maetsyterahydrophtasic anhydride, 40 g of benzyldimethylamins, 9.75 kg of quartz W 12, of Quamzwerke Frechen, Germany, and 30 g of an ester an based on montan wax having a dropping point of 83° C., commercially available under the name "Hoechst Wachs KSL", of Hoechst AG, are melted together, with stirring, at 140° C. The resulting readily stirrable liquid is then stirred for another 20 minutes at 140° C. Subsequently, the mixture is degassed at 140° C. and at about $3 \cdot 10^{-2}$ Pa for 15 minutes. The mixture is filled into the autoclave of an APG press, of Leisure & Vogel, and is then cast by the pressure gelation process in a casting mould for support insulators, preheated to 145–155° C., and cured for 16 minutes at 145–155° C. Support insulators are thus obtained which can be demoulded independently and which, according to X-ray spectroscopy, are void-free. The support insulators can be independently demoulded without any problems even after 26 applications to the mould.

Support insulators which have metal inserts have a cantilever strength according to DIN 48136-68 of 5402 H.

What is claimed is:

1. An epoxy resin composition, comprising
   (a) an epoxy resin which is liquid at below 160° C. and which has an average of more than one epoxy group in the molecule,
   (b) a di- or polycarboxylic acid or its anhydride,
   (c) 0.1–15% by weight, based on the amount of components (a) and (b), of a wax having a dropping point from 80 to 95° C. and, optionally,
   (d) customary fillers or modifiers for epoxy resins selected from mineral and fibrous fillers, carbon fibers, textile fibers, pigments, dyes, flame retardants, thixotropic agents, flow control agents, antioxidants and light stabilizers, and mixtures thereof, wherein the amount of component (d) is less than or equal to about 85% by weight, based on the amounts of components (a), (b) and (c).

2. An epoxy resin composition according to claim 1, wherein component (a) is a liquid polyglycidyl ether or ester.

3. An epoxy resin composition according to claim 1, wherein component (a) is a liquid bisphenol diglycidyl ether or a liquid diglycidyl ester of a cycloaliphatic or aromatic dicarboxylic acid.

4. An epoxy resin composition according to claim 1, wherein component (b) is a cycloaliphatic dicarboxylic acid anhydride.

5. An epoxy resin composition according to claim 1, wherein component (c) is an ester wax based on montan wax.

6. An epoxy casting resin composition, comprising
   (a) an epoxy resin which is liquid at below 160° C. and which has an average of more than one epoxy group in the molecule,
   (b) a polycarboxylic acid or its anhydride,
   (c) 0.1–15% by weight, based on the amount of components (a) and (b), of a wax having a dropping point from 80 to 95° C. and, optionally,
   (d) customary fillers or modifiers for epoxy casting resin compositions selected from mineral and fibrous fillers, carbon fibers, textile fibers, pigments, dyes, flame retardants, thixotropic agents, flow control agents, antioxidants and light stabilizers, and mixtures thereof, wherein the amount of component (d) is less than or equal to about 85% by weight, based on the amounts of components (a), (b) and (c).

7. An epoxy casting resin composition according to claim 6, wherein component (a) is a liquid polyglycidyl other or ester.

8. An epoxy casting resin composition according to claim 6, wherein component (a) is a liquid bisphenol diglycidyl ether or a liquid diglycidyl ester of a cycloaliphatic or aromatic dicarboxylic acid.

9. An epoxy casting resin composition according to claim 6, wherein component (b) is a cycloaliphatic dicarboxylic acid anhydride.

10. An epoxy casting resin composition according to claim 6, wherein component (c) is an ester wax based on montan wax.

11. A method for preparing moulded articles by applying the pressure gelation process which comprises casting a degassed and preheated to above 100° C. composition according to claim 6 under a slight pressure into a mold in an amount to fill the mold and compensating for any shrinkage during processing by subsequent further addition by adjusting the pressure.

12. A method for preparing molded articles by applying the automatic pressure gelation (APG) process which comprises
   filling a degassed and heated to above 100° C. composition according to claim 6 under a slight pressure in the range from $0.1 \cdot 10^{-5}$ Pa to $5.0 \cdot 10^{-5}$ Pa in an amount to fill the mold, which is preheated to above 100° C., compensating for any shrinkage during processing by subsequent further addition by adjusting the pressure.

13. A method according to claim 12, wherein component (a) is a liquid polyglycidyl ether or ester.

14. A method according to claim 12, wherein component (a) is a liquid bisphenol diglycidyl ether or a liquid diglycidyl ester of a cycloaliphatic or aromatic dicarboxylic acid.

15. A method according to claim 12, wherein component (b) is a cycloaliphatic dicarboxylic acid anhydride.

16. A method according to claim 12, wherein component (c) is an ester wax based on montan wax.

* * * * *